No. 723,829. PATENTED MAR. 31, 1903.
W. L. CHURCHILL.
STORE SERVICE APPARATUS.
APPLICATION FILED MAR. 26, 1902.
NO MODEL. 4 SHEETS—SHEET 1.
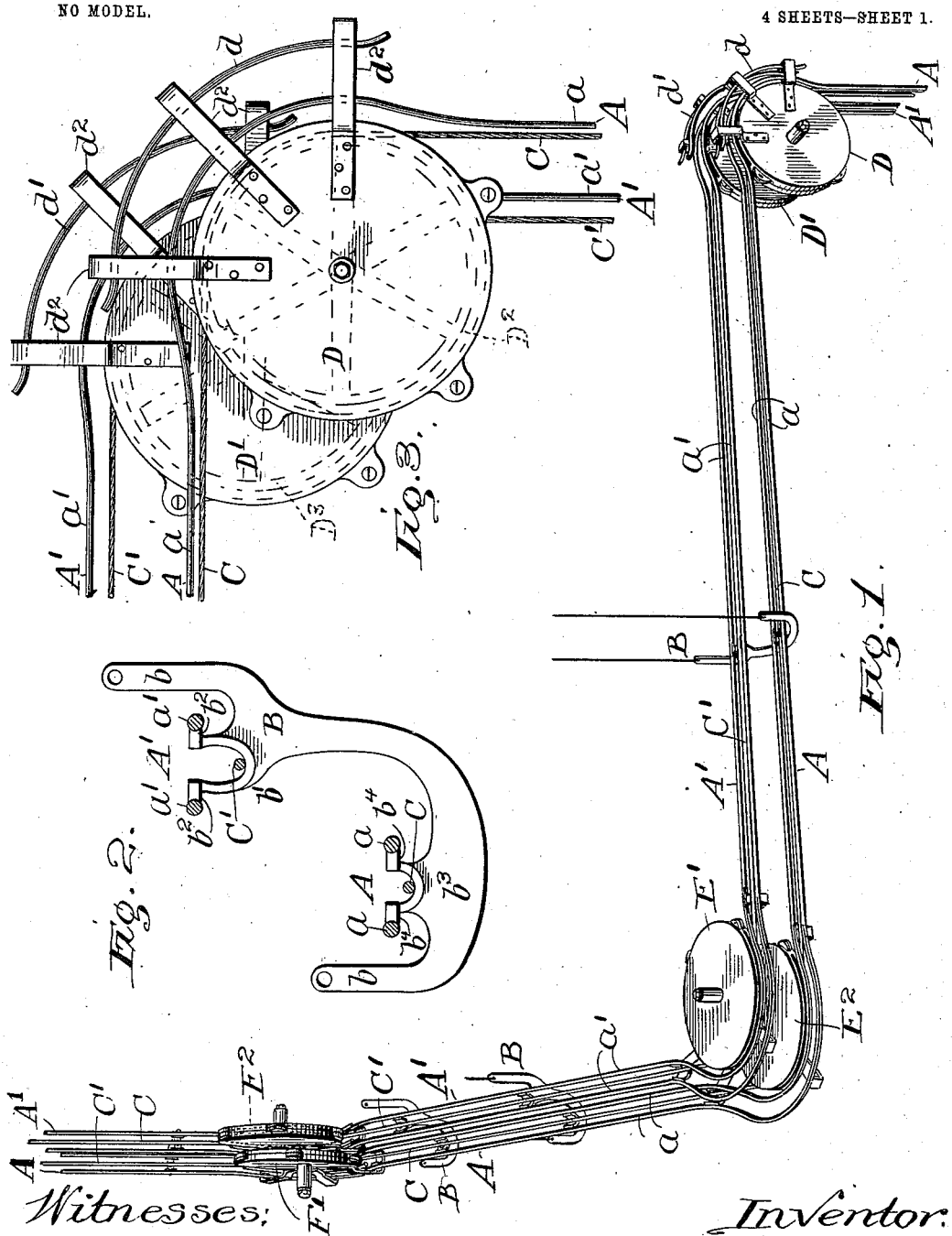
Witnesses:
Chas. O. Shurley
S. Bliss
Inventor:
William L. Churchill
by H. Ritner
Atty.

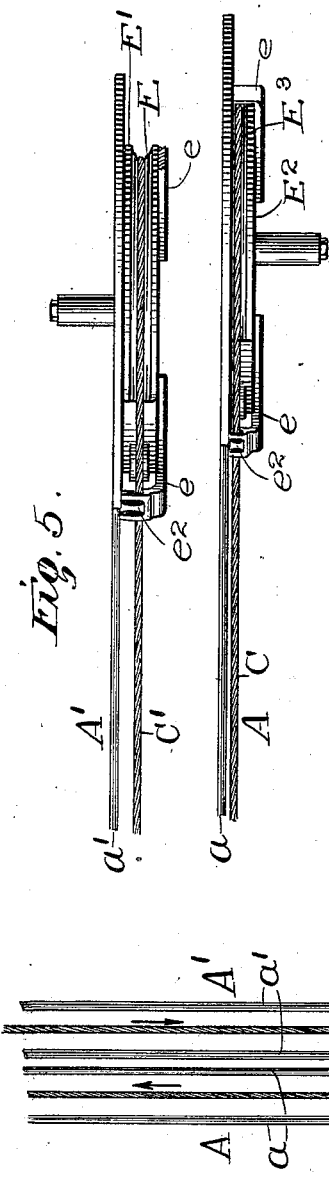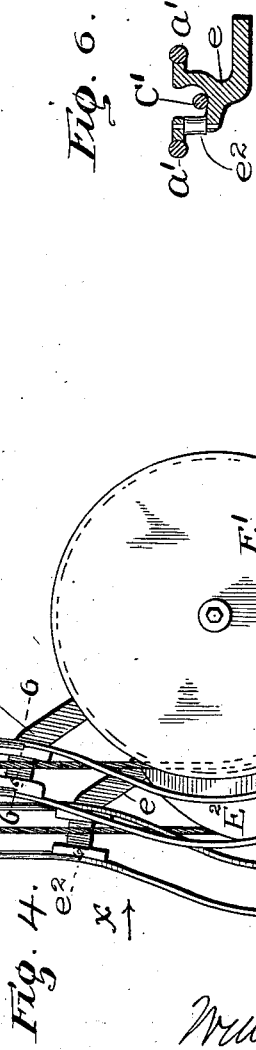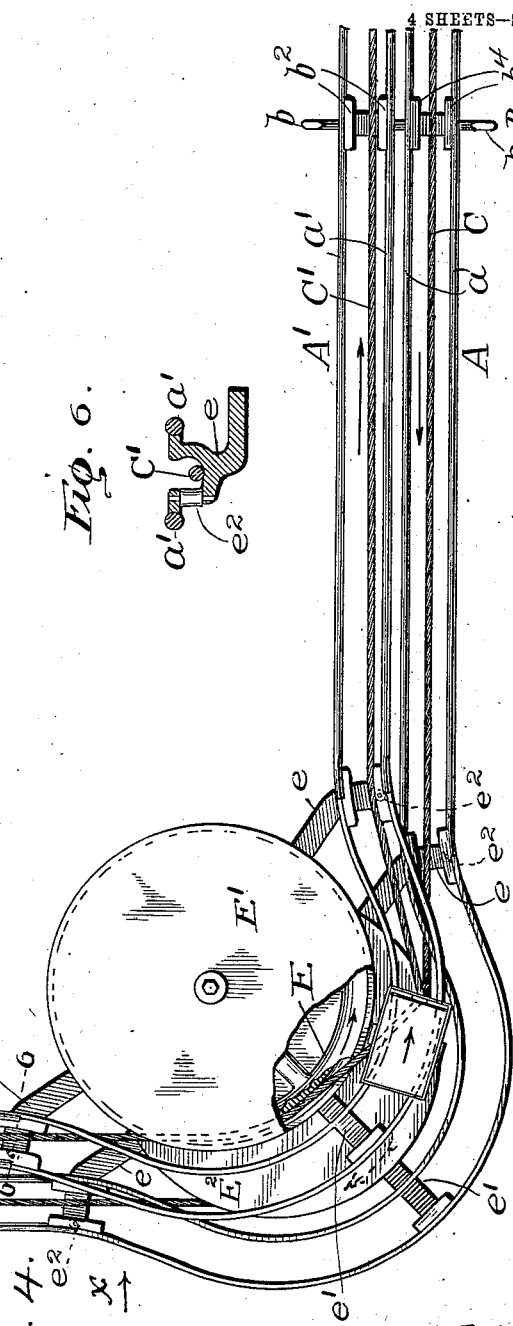

No. 723,829. PATENTED MAR. 31, 1903.
W. L. CHURCHILL.
STORE SERVICE APPARATUS.
APPLICATION FILED MAR. 26, 1902.
NO MODEL. 4 SHEETS—SHEET 3.
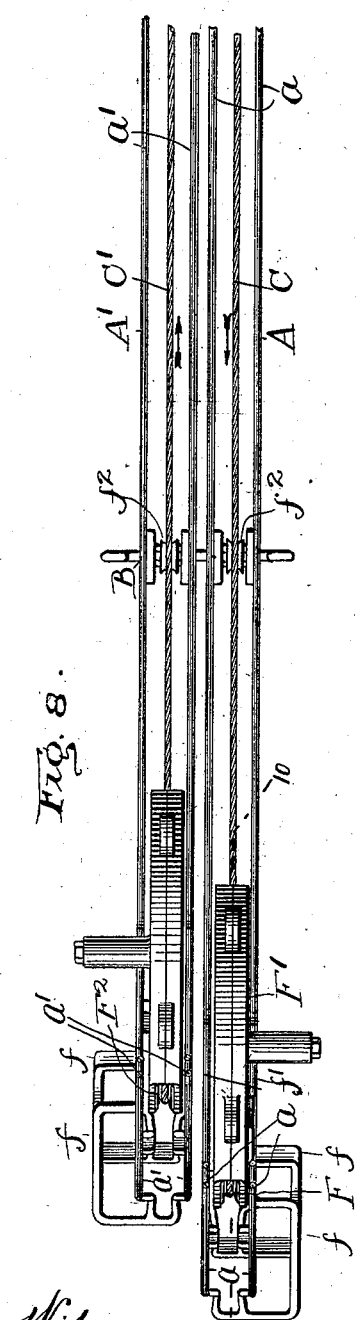
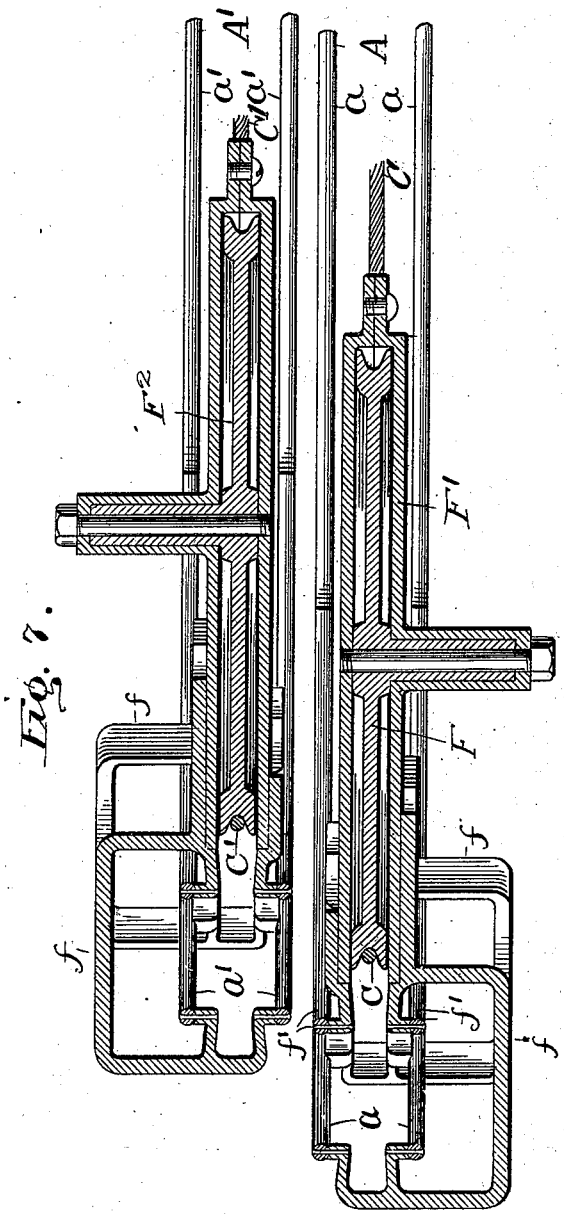

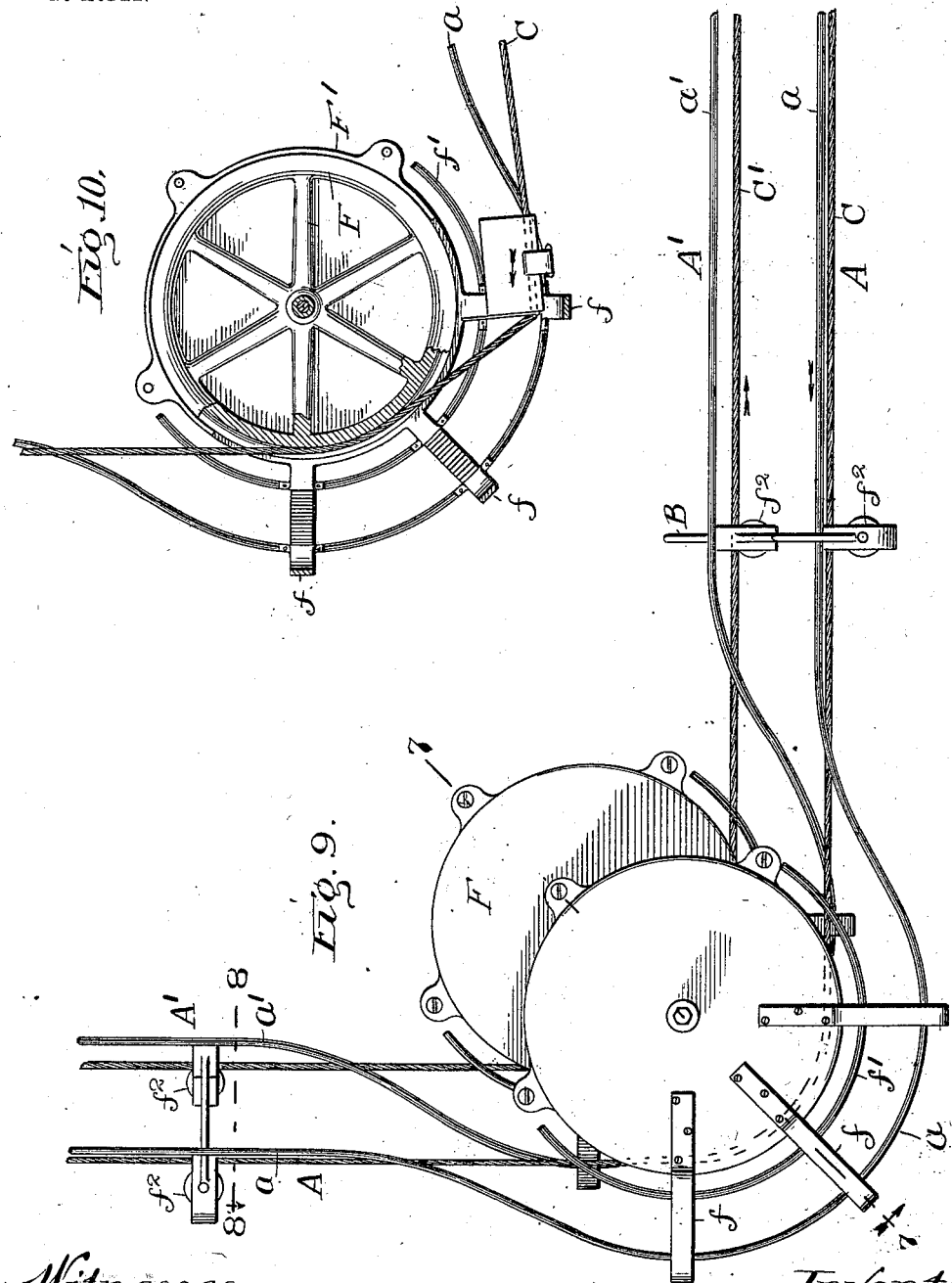

UNITED STATES PATENT OFFICE.

WILLIAM L. CHURCHILL, OF CHICAGO, ILLINOIS, ASSIGNOR TO NATIONAL PNEUMATIC SERVICE COMPANY, OF CHICAGO, ILLINOIS, A CORPORATION OF ILLINOIS.

STORE-SERVICE APPARATUS.

SPECIFICATION forming part of Letters Patent No. 723,829, dated March 31, 1903.

Application filed March 26, 1902. Serial No. 100,029. (No model.)

*To all whom it may concern:*

Be it known that I, WILLIAM L. CHURCHILL, a citizen of the United States of America, residing at Chicago, in the county of Cook and State of Illinois, have invented certain new and useful Improvements in Store-Service Apparatus, of which the following is a specification.

My invention relates to certain new and useful improvements in store-service apparatus; and its object is to produce a system of store-service or cash-carrier apparatus which shall be simpler and more compact than the systems of the same general type heretofore in use and which shall have certain other advantages, which will be hereinafter pointed out.

To these ends my invention consists in certain novel features or characteristics, which are fully illustrated in the accompanying drawings, and described in this specification.

In the drawings, Figure 1 is a perspective of a portion of my improved system, showing generally many of the features thereof. Fig. 2 is an elevation of one of the supporting-brackets, showing clearly the relative positions of the tracks of the system. Fig. 3 is an elevation of a downturn corner—that is, the corner shown at the right-hand end of Fig. 1. Fig. 4 is a plan of a horizontal corner, showing certain parts broken away, this corner being the middle one of Fig. 1. Fig. 5 is an elevation looking in the direction of the arrow X in Fig. 4. Fig. 6 is a detail section in the line 6 6 of Fig. 4. Fig. 7 is a section in the line 7 7 of Fig. 9 looking in the direction of the arrow, this corner being an upturn corner—that is, the back corner of Fig. 1. Fig. 8 is a section in the line 8 8 of Fig. 9 looking downward. Fig. 9 is an elevation of the upturn corner; and Fig. 10 is a horizontal section in line 10 10 of Fig. 8, showing the carrier passing over an upturn corner.

Referring to the drawings, A A' are two lines of tracks composed, respectively, of parallel rails $a\ a\ a'\ a'$. These rails are preferably circular in cross-section, and they are so supported that the tracks A A', while parallel throughout the length of the system, are diagonally disposed to each other. The relations of the tracks are clearly shown in Fig. 2, wherein B is the supporting-bracket, adapted to be suspended or supported, as desired. Two upwardly-extending portions $b\ b$ furnish means of supporting the bracket. The bracket, it will be seen, is in general curved, one of the tracks being supported upon an inwardly-extending portion of the upper sweep of the curve and the other track being supported upon a similar extension upon the lower sweep of the curve. This results in one of the tracks being raised above the other and also offset therefrom in the planes of the tracks. The track A' is supported upon an extension $b'$ on the upper part of the bracket, and this extension is notched, as shown, to permit one bight of the cable C' to run within it. The upper portions of the extension $b'$ have small lateral extensions $b^2\ b^2$ to support the rails $a'\ a'$. The track A is similarly supported upon an extension $b^3$ on the lower portion of the bracket B, this portion being notched to receive the other bight of the cable C. The portion $b^3$ has laterally-extending portions $b^4\ b^4$, similar to the extensions $b^2\ b^2$, which support the rails $a\ a$ of the track A. In connection with the position of the rails $a\ a$ and $a'\ a'$ I would say that I have arranged them as herein shown—that is, supported on outwardly-extending lugs—for the reason that I intend to use this track system primarily in connection with a cash-carrier covered by my patents on cash-carriers numbered 713,059, 713,060, and 713,557, dated November 11, 1902. This cash-carrier is secured upon the rails by means of hooks which extend downwardly from its sides and inward underneath the rails. It will be obvious that with this type of carrier the tracks must be supported from the inside in order to permit the free passage of the carrier-hooks over the brackets.

The downturned corner illustrated in Fig. 3, as before pointed out, is that shown at the right-hand side of Fig. 1, and it is a corner wherein the carrier, proceeding to the right of Fig. 1, changes to a vertical motion, running over the outside of the pulley at the corner and keeping the propelling-cable between itself and the pulley at all times. This corner is simple in construction, it being little more than a downward bend in the track. The pulleys are shown in dotted lines at $D^2$ $D^3$ in the drawings and are incased in the closed box casings or housings D D', the centers of these pulleys having the same relation to each other as do corresponding points in the tracks. In other words, the centers of the pulleys are offset with relation to each other, one being behind and above the other, the line of the offset being of course in the direction of the radius of the curve, so that when the tracks have passed over the pulleys they will still have the same relative positions as they had coming to it. Guard-rails $d$ $d'$, supported upon brackets $d^2$, are provided, against which the carriers rest in passing around the corner. Normally the hooks upon the carrier are sufficient to prevent them from flying off the rails; but I have provided these guard-rails to prevent undue strain upon the hooks and effectively prevent any accidents due to their breaking on account of the extra strain occasioned by centrifugal force in passing over the pulleys. The first advantage of the offset position of the tracks appears in this downturned corner. When the tracks are placed vertically one over the other, as has heretofore been a common practice, it has been found necessary to twist them to bring them into the same horizontal plane before passing around this sort of corner. It will be seen that with the offset tracks herein shown there are no unnecessary curves to increase the friction wear of the parts.

Referring now to the horizontal corner illustrated in Figs. 4, 5, and 6, E is one pulley suitably journaled, inclosed by the housing E'. The pulley upon the other track is shown at $E^3$, together with its housing $E^2$, in Fig. 5. It will be understood that the corners on both the upper and lower tracks are essentially alike. In my horizontal corner the carrier merely slides around the curve without turning, so as to bring the cable-jaws toward the pulley, the cable being stretched away from the pulley, as is clearly shown in Fig. 4, to permit this. It is therefore necessary that the inner rail of each track shall be unsupported throughout the entire curve about the pulleys, so that the cable may run underneath it. For this reason the outer rail $a'$ is supported, as shown, by brackets $e$ $e'$ $e$, secured to the housings E $E^2$, while the inner rail $a'$ is supported only at its ends—that is, at the point where it joins with the straight track. Inasmuch as the cable is pulled out into the track and away from the pulley at the time the carrier passes around the corner, it rubs at times against the end brackets $e$, as shown in Fig. 4. To prevent wear on the cable, I have journaled upon this portion of the brackets $e$ a roller $e^2$ to prevent this friction. This is clearly shown in Fig. 6. Of course such a roller is unnecessary at the center bracket $e'$, for the reason that the cable never comes beyond the middle of the tracks at that point. For greater strength I construct the rails on this horizontal pulley of square material rather than of the circular, like the tracks throughout the length of the system. I consider this a particularly advantageous arrangement of the horizontal pulley for the reason that it requires no twist in the tracks. The carrier herein runs around the pulley without turning its bottom toward it, and this is desirable inasmuch as it avoids the necessity of twisting the tracks in order to turn the bottom of the carrier toward the pulley. Any freedom from twisting and extra curves in a system of this sort is a great advantage, owing to the fact that extra curves mean extra friction, and consequently loss of power, and also greater wear upon all the parts of the system.

Referring now to the upturn corner, Figs. 7, 8, 9, and 10, F $F^2$ are the pulleys. One pulley and the arrangement of one track only will be described, the arrangement of the other being similar. In this corner F is a pulley grooved as shown in Figs. 7, 8, and 10. Upon this runs the cable C. The rails $a$ $a$ of the track A are supported upon brackets $f$ $f$ $f$, secured to the housing F' of the pulley F. The relations of these parts are clearly shown in the section in Fig. 10, the tracks being so supported as to permit the carrier to run over them between the tracks and the pulley. This, it will be seen, necessitates that the cable C be stretched away, as in the case of the horizontal pulley heretofore described. Inasmuch, however, as it is stretched away at right angles to the plane of the track instead of parallel to it, the anti-friction-rollers are placed in the lower curve of the bracket nearest the corner. These rollers are designated by $f^2$. Inasmuch as the stretching of the cable is much greater on this corner than is the stretching on the horizontal corner, the strain upon the carrier and the carrier-hooks is proportionately greater, and for this reason I have provided two guide-rails $f'$ $f'$, supported upon the brackets $f$ $f$ $f$ and parallel to the curve of tracks $a$ $a$. The result of this is practically that when the carrier comes around the curve its weight is removed from the rails $a$ $a$ and is transferred to the guide-rails $f'$ $f'$, and the carrier runs on these rails around the corner and then its weight is transferred back to the regular tracks $a$ $a$.

The advantages of running the carrier over an upturned pulley in the manner herein shown and described are substantially those attained in the advantages of my horizontal pulley, except that they are greater. It is extremely undesirable to twist the tracks upon which the carrier runs to such an extent that the bottom of the carrier is turned toward the pulleys, for in this type of carrier this means a one-hundred-and-eighty-degree twist. The use of the offset tracks herein has the same advantage as that set forth in connection with the downturned corner—that is, space is economized and unnecessary curves are avoided.

The system as a whole possesses still other advantages, in that it permits carriers to be placed upon either of the tracks at any point in their length. It will be seen that the system as here described—that is, the offset tracks and the different corners—permits each of the tracks to run in any direction desired without any reference whatever to the other track and also keeps them so close together as not to take up any extra space. The advantages of so placing tracks that each one can be run as desired without any reference to or allowance for the position of the other will be at once apparent to any one familiar with the art.

More or less variation in exact construction is of course possible, and I do not consider my invention to be limited to the specific details above described.

I claim as new and desire to secure by Letters Patent—

1. In a device of the class described, the combination with two tracks, each composed of two parallel rails, of a curved bracket, B, having two extensions, $b'$, $b^3$, angularly disposed with reference to each other, one of said extensions being adapted to support one of said tracks and the other of said extensions being adapted to support the other of said tracks; substantially as described.

2. In a system of the class described, the combination with two lines of track, each composed of two parallel rails, of a bracket, B, having two extensions, $b'$, $b^3$, obliquely disposed with reference to each other, of lateral arms upon said extensions adapted to support the rails of said tracks from the inside and said arms being separated to receive the propelling-cable between them; substantially as described.

3. In a device of the class described, the combination with a track composed of parallel rails, of a curve in said track, a grooved pulley within said curve, adapted to receive a propelling-cable, a suitable casing for said pulley, and brackets secured to said casing, adapted to support the outer rail of the curved portion of said track, the inner rail of said curved portion being unsupported throughout the curve; substantially as described.

4. In a device of the class described, the combination with a suitable line of track, a curved portion therein, and a pulley within said curved portion, of suitable brackets adapted to support the curved portion of said track and antifriction-rollers supported upon said brackets; substantially as described.

5. In a device of the class described, the combination with a line of track, and a curved portion thereof, of a pulley within said curved portion, an inclosing box for said pulley, brackets attached to said inclosing box, adapted to support said curved track and a guide-rail between said track and said pulley, also supported by said brackets and parallel to said track, substantially as described.

In witness whereof I have hereunto set my hand, at Chicago, in the county of Cook and State of Illinois, this 21st day of March, A. D. 1902.

WILLIAM L. CHURCHILL.

Witnesses:
CHAS. O. SHERVEY,
S. BLISS.